(12) United States Patent
Stalsberg et al.

(10) Patent No.: US 6,795,792 B2
(45) Date of Patent: Sep. 21, 2004

(54) CONTINUOUS FLOW METHOD AND SYSTEM FOR PLACEMENT OF BALANCING FLUID ON A ROTATING DEVICE REQUIRING DYNAMIC BALANCING

(75) Inventors: Kevin J. Stalsberg, White Bear Lake, MN (US); Gary E. Determan, Maple Grove, MN (US)

(73) Assignee: Honeywell International Inc., Morristown, NJ (US)

(*) Notice: Subject to any disclaimer, the term of this patent is extended or adjusted under 35 U.S.C. 154(b) by 230 days.

(21) Appl. No.: 10/001,006

(22) Filed: Nov. 15, 2001

(65) Prior Publication Data

US 2003/0101018 A1 May 29, 2003

(51) Int. Cl.[7] .............................................. G01G 11/00
(52) U.S. Cl. ..................... 702/173; 702/147; 702/68; 702/23; 702/23.1; 702/23.2; 702/12.06; 702/8; 702/159
(58) Field of Search ................................ 702/147, 173; 68/23, 23.1, 23.2, 12.06; 8/159

(56) References Cited

U.S. PATENT DOCUMENTS

| | | | |
|---|---|---|---|
| 3,799,348 A | 3/1974 | Mazza | 210/144 |
| 3,983,035 A | 9/1976 | Arkeveld et al. | 210/138 |
| 4,000,658 A | 1/1977 | Schmidt | 73/490 |
| 4,157,781 A | 6/1979 | Maruyama | 233/23 A |
| 4,322,641 A | 3/1982 | Packard | 307/521 |
| 4,694,156 A | 9/1987 | Swanberg | 250/214 |
| 4,991,247 A | 2/1991 | Castwall et al. | 8/158 |
| 5,150,314 A | 9/1992 | Garratt et al. | 364/571.02 |
| 5,280,660 A | 1/1994 | Pellerin et al. | 8/158 |
| 5,325,677 A | 7/1994 | Payne et al. | 68/12.04 |
| 5,376,063 A | 12/1994 | Greenstein | 494/37 |
| 5,453,097 A | * 9/1995 | Paradis | 604/247 |

(List continued on next page.)

FOREIGN PATENT DOCUMENTS

| | | | | |
|---|---|---|---|---|
| EP | 1 036 875 A2 | 9/2000 | | D06F/39/08 |
| WO | WO 99/53130 | * 10/1999 | | |

*Primary Examiner*—John Barlow
*Assistant Examiner*—Anthony T. Dougherty
(74) *Attorney, Agent, or Firm*—Kris T. Fredrick; Kermit D. Lopez; Luis M. Ortiz (57) ABSTRACT

Methods and systems for continuously transferring balancing mass to a rotating system or rotating device in order to dynamically balance the rotating system or rotating device are disclosed. A flow of balancing mass can be continuously provided to the rotating system at a controlled flow rate. A pump integrated with the rotating system can be utilized to provide via pump the flow of the balancing mass to the rotating system at a controlled flow rate. The flow of balancing mass can be thereafter discharged at a shutter device integrated with the rotating system, such that the balancing mass passes through a window of the shutter device if the window is open. The balancing mass is passed through the window so as to be transferred to the rotating device at predetermined locations, thereby contributing to the balancing of the rotating system. The balancing mass is generally automatically recirculated through the rotating system if the window of the shutter device is closed. The window of the shutter device may be configured as a fixed or adjustable window. The shutter device itself may be, for example, a solenoid actuated shutter or a slotted-disk device. The controlled flow rate to the shutter device may be adjusted for varying control need across the range of rotational speeds. This method and system overcomes flow and timing difficulties experienced with solenoid actuated valve mass transfer techniques.

20 Claims, 7 Drawing Sheets

U.S. PATENT DOCUMENTS

| | | | |
|---|---|---|---|
| 5,490,436 A | 2/1996 | Coyne et al. | 74/573 |
| 5,561,993 A * | 10/1996 | Elgersma et al. | 68/23.2 |
| 5,582,040 A * | 12/1996 | Khan | 68/23.2 |
| 5,692,313 A | 12/1997 | Ikeda et al. | 34/58 |
| 5,715,731 A | 2/1998 | Koch | 74/573 |
| 5,729,025 A | 3/1998 | Erickson et al. | 250/574 |
| 5,731,868 A | 3/1998 | Okey et al. | 356/73 |
| 5,757,481 A | 5/1998 | O'Brien et al. | 356/243 |
| 5,761,932 A | 6/1998 | Kim | 68/23.2 |
| 5,761,933 A | 6/1998 | Kim et al. | 68/23.2 |
| 5,765,402 A | 6/1998 | Ikeda et al. | 68/12.06 |
| 5,800,628 A | 9/1998 | Erickson et al. | 134/18 |
| 5,850,748 A | 12/1998 | Kim et al. | 68/23.2 |
| 5,862,553 A | 1/1999 | Haberl et al. | 8/159 |
| 5,870,907 A | 2/1999 | Cho | 68/23.1 |
| 5,893,280 A * | 4/1999 | Honda et al. | 68/12.06 |
| 5,913,951 A | 6/1999 | Herr et al. | 8/158 |
| 5,921,148 A | 7/1999 | Howell | 74/573 |
| 5,923,433 A | 7/1999 | Giuffre et al. | 356/440 |
| 5,957,144 A | 9/1999 | Neff et al. | 134/56 D |
| 5,960,804 A | 10/1999 | Cooper et al. | 134/56 D |
| 5,979,236 A | 11/1999 | Hong et al. | 73/458 |
| 6,007,640 A | 12/1999 | Neff et al. | 134/18 |
| 6,029,300 A | 2/2000 | Kawaguchi et al. | 8/159 |
| 6,047,428 A | 4/2000 | Min | 8/159 |
| 6,077,423 A | 6/2000 | Roy et al. | 210/121 |
| 6,082,151 A | 7/2000 | Wierzba et al. | 68/23.2 |
| 6,129,768 A | 10/2000 | Johnson et al. | 8/159 |
| 6,130,928 A | 10/2000 | Jamzadeh et al. | 377/23 |
| 6,144,447 A | 11/2000 | Ohman et al. | 356/246 |
| 6,148,647 A | 11/2000 | Kabeya et al. | 68/140 |
| 6,159,384 A | 12/2000 | Roberts et al. | 210/741 |
| 6,418,758 B1 * | 7/2002 | Ikeda et al. | 68/12.06 |
| 6,477,867 B1 * | 11/2002 | Collecutt et al. | 68/12.06 |
| 6,510,715 B1 * | 1/2003 | Simsek | 68/12.06 |
| 6,532,422 B1 * | 3/2003 | Elgersma et al. | 702/41 |
| 6,569,335 B1 * | 5/2003 | Johnson | 210/614 |

* cited by examiner

CONTINUOUS FLOW METHOD AND SYSTEM FOR PLACEMENT OF BALANCING FLUID ON A ROTATING DEVICE REQUIRING DYNAMIC BALANCING

RELATED APPLICATIONS

This application is related to co-pending and co-owned patent applications entitled: 'Method and Apparatus for Reducing Microprocessor Speed Requirements in Data Acquisition Applications,' U.S. Ser. No. 09/792,996, filed on Feb. 26, 2001; 'Method and System for Detecting Fluid Injection from Stationary to Rotating Members,' U.S. Ser. No. 09/951,790, filed on Sep. 10, 2001; 'Simultaneous Injection Method and System for a Self-Balancing Rotatable Apparatus,' U.S. Ser. No. 09/896,763, filed on Jun. 29, 2001; 'Energy-Based Thresholds Applied to Dynamic Balancing,' U.S. Ser. No. 09/951,798, filed on Sep. 10, 2001; 'Dynamic Correlation Extension for a Self-Balancing Rotatable Apparatus,' U.S. Ser. No. 09/951,932, filed on Sep. 10, 2001; 'Dynamic Balancing Application Mass Placement', U.S. Ser. No. 10/001,090, filed on Nov. 15, 2001; 'Fixed-Bandwidth Correlation Window Method and System for a Self-Balancing Rotatable Apparatus,' U.S. Ser. No. 09/999, 594, filed on Nov. 15, 2001; 'Supervisory Method and System for Improved Control Model Updates Applied to Dynamic Balancing,' U.S. Ser. No. 10/011,218, filed on Nov. 15, 2001; 'Data Manipulation Method and System for a Self-Balancing Rotatable Apparatus,' U.S. Ser. No. 10/000,882, filed on Nov. 15, 2001; 'Resonance Identification Extension for a Self-Balancing Rotatable Apparatus,' U.S. Ser. No. 10/001,098, filed on Nov. 15, 2001; 'Method and System for Mechanizing Simultaneous Multi-Actuator Actions Applied to Dynamic Balancing,' U.S. Ser. No. 10/000,255, filed on Nov. 15, 2001.

TECHNICAL FIELD

The present invention relates generally to rotatable members that are able to achieve balanced conditions throughout a range of rotational speeds. The present invention also relates to methods and systems for dynamically balancing rotatable members through the continual determination of out-of-balance forces and motion to thereby take corresponding counter balancing action. The present invention additionally relates to methods and systems for actively placing inertial masses within a rotating body in order to cancel rotational imbalances associated with the rotating body thereon.

BACKGROUND OF THE INVENTION

When rotatable objects are not in perfect balance, non-symmetrical mass distribution creates out-of-balance forces because of the centrifugal forces that result from the rotation of the object. This mass imbalance can result in machine vibrations that are synchronous with the rotational speed. Such vibrations can lead to excessive wear and unacceptable levels of noise.

Balancing of a rotatable body is commonly achieved by adjusting a distribution of moveable, inertial masses attached to the body. In general, this state of balance may remain until there is a disturbance to the system. A tire, for instance, can be balanced once by applying weights to it and the tire will remain balanced until it hits a very big bump or the weights are removed. However, certain types of bodies that have been balanced in this manner will generally remain in balance only for a limited range of rotational velocities. One such body is a centrifuge for fluid extraction, which can change the degree of balance as speed is increased and more fluid is extracted.

Many machines are also configured as freestanding spring mass systems in which different components thereof pass through resonance ranges during which the machine may become out of balance. Additionally, such machines may include a rotating body loosely coupled to the end of a flexible shaft rather than fixed to the shaft as in the case of a tire. Thus, moments about a bearing shaft may also be created merely by the weight of the shaft. A flexible shaft rotating at speeds above half of its first critical speed can generally assume significant deformations, which add to the imbalance.

Machines of this kind usually operate above their first critical speed. As a consequence, machines that are initially balanced at relatively low speeds may tend to vibrate excessively as they approach full operating speed. Additionally, if one balances to an acceptable level rather than to a perfect condition (which is difficult to measure), the small remaining "out-of-balance" will progressively apply greater force as the speed increases. This increase in force is due to the fact that F is proportional to $r\omega^2$, (note that F is the out-of-balance force, r is the radius of the rotating body and $\omega$ is its rotational speed).

The mass imbalance distributed along the length of a rotating body gives rise to a rotating force vector at each of the bearings that support the body. In general, the force vectors at respective bearings are not in phase. At each bearing, the rotating force vector may be opposed by a rotating reaction force, which can be transmitted to the bearing supports as noise and vibration. The purpose of active, dynamic balancing is to shift an inertial mass to the appropriate radial eccentricity and angular position for canceling the net imbalance. At the appropriate radial and angular distribution, the inertial mass can generate a rotating centrifugal force vector equal in magnitude and phase to the reaction force referred to above. Although rotatable objects find use in many different applications, one particular application is a rotating drum of a washing machine.

Many different types of balancing schemes are known to those skilled in the art. U.S. Pat. No. 5,561,993, which was issued to Elgersma et al. on Oct. 22, 1996, and is incorporated herein by reference, discloses a self-balancing rotatable apparatus. Elgersma et al. disclosed a method and system for measuring forces and motion via accelerations at various locations in a system. The forces and moments were balanced through the use of a matrix manipulation technique for determining appropriate counterbalance forces located at two axial positions of the rotatable member. The method and system described in Elgersma et al. accounted for possible accelerations of a machine, such as a washing machine, which could not otherwise be accomplished if the motion of the machine were not measured. Such a method and system was operable in association with machines not rigidly attached to immovable objects, such as concrete floors. The algorithm disclosed by Elgersma et al. permitted counterbalance forces to be calculated even when the rotating system (such as a washing machine), was located on a flexible or mobile floor structure combined with carpet and padding between the washing machine and a rigid support structure.

U.S. Pat. No. 5,561,993 thus described a dynamic balance control algorithm for balancing a centrifuge for fluid extraction. To accomplish such balance control, balance control actions may place mass at the periphery of axial control planes on the centrifuge. Related sensor responses to balancing control actions on a centrifuge may be modeled and utilized to determine control actions that would serve to drive an associated system toward a balanced state. Such a system is generally time variant, such that the control models utilized therein may need to be routinely updated based on the measured response to a previous control action, which is a variation of perturbation theory, well known in the art. The control actions may require multiple control actuators; generally one per axial control plane, although multiple actuators at multiple control planes may emulate additional virtual control planes.

A variety of control action actuation techniques have been developed for use with rotating devices or rotating systems, such as washing machines. Such control techniques generally depend on an actuation system based on the placement of mass on a rotating apparatus from its stationary surroundings, requiring accuracy in amount and placement of the counterbalancing mass. A limited amount of mass can be placed at a specific location only once per revolution, and the actuator action is a step action with a flow and transport timing characteristic. On-off actuated valve methods and systems, e.g., solenoid actuated valves, have been developed to place fluid mass on the rotating apparatus so as to achieve balance. These methods and systems suffer from highly variable head pressures from one control action to the next and from inconsistent flow-rate profiles across a single control action, thereby leading to uncertainty in the amount and placement of the counterbalancing mass. Additionally, these method and systems poorly address the need to adjust flow rate such that there is increased flow at lower rotating speeds where balancing generally occurs, and less flow at higher rotating speeds where minor balancing corrections may be required.

Based on the foregoing, it can be appreciated that a method and system are required to place mass on a rotating apparatus from its stationary surroundings, that reduces the dependence on head pressure, improves flow rate consistency within a single control action, and supports differing flow rates to accommodate different control needs across operational speeds. Also, the method and system need to be on the order of complexity, or less, than that of a solenoid actuated valve. The invention disclosed herein addresses these needs and the related concerns.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is one aspect of the present invention to provide methods and systems in which rotatable members can achieve balanced conditions throughout a range of rotational speeds.

It is another aspect of the present invention to provide methods and systems for dynamically balancing rotatable members through the continual determination of out-of-balance forces and motion to thereby take corresponding counter balancing action.

It is yet another aspect of the present invention to provide methods and systems for transferring balancing mass to a rotating system or rotating device in order to dynamically balance the rotating system or rotating device.

In accordance with various aspects of the present invention, methods and systems are disclosed herein for transferring balancing mass to a rotating apparatus from its stationary surroundings, in order to dynamically balance the rotating system. A flow of balancing mass can be continuously provided to the rotating system at a controlled flow rate. The flow of balancing mass can be thereafter discharged at a shutter device integrated with the rotating system, such that the balancing mass passes through a window of the shutter device if the window is open, thereby contributing to the balancing of the rotating system. The balancing mass is generally automatically recirculated if the window of the shutter device is closed.

The shutter device itself may be, for example, a solenoid actuated shutter or a rotating slotted-disk device. The solenoid-actuated shutter may simply be an open-close action with fixed window size. The rotating slotted-disk may have a window that can be configured as an adjustable or fixed window. An adjustable window would be sized for the desired angular span and the slotted-disk would rotate in lock step with the rotating apparatus. A fixed window may accommodate different angular spans via relative speed. This shutter device allows the placement of mass to be very responsive.

The balancing mass may be targeted at the shutter device in order to discharge the flow of the balancing mass through the window of the shutter device. A pump integrated with the rotating system can be utilized to provide the flow of the balancing mass to the rotating system at a controlled flow rate. The flow of balancing mass from the pump generally provides independence from head pressure concerns. The controlled flow rate of the balancing mass may be adjusted through a variable speed pump and can also be adjusted utilizing a nozzle device. The controlled flow rate can be adjusted automatically or otherwise to account for varying rotation speeds of the rotating system at continuous or discrete levels. The varying flow rates are utilized for different control needs such as large mass transfer at lower speeds for initial balance and small mass transfers at higher speeds for fine balance adjustments.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

The present invention involves the placement of balancing mass on a rotatable member, associated with control model formulation, prediction of balance control actions, and balance control actions. The basic configuration and concepts explained in U.S. Pat. No. 5,561,993 are discussed herein for illustrative purposes only, in order to explain the foundation from which the present invention was derived, but do not limit the scope of the present invention, including preferred embodiments discussed herein. Features revealed in U.S. Pat. No. 5,561,993 are presented herein for illustrative purposes only and those skilled in the art can appreciate that such features, including figure, text, descriptions, equations and tables thereof do not limit the scope of the present invention.

Figure 1:
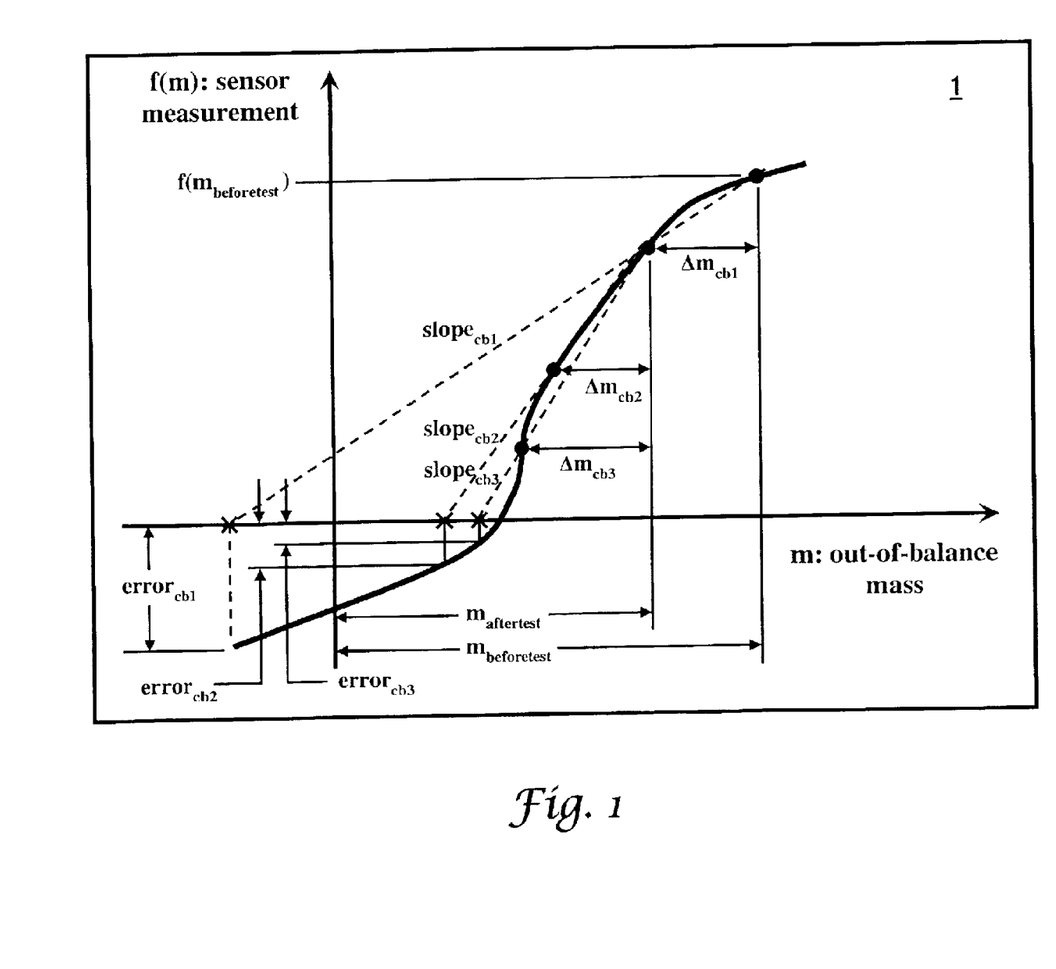
FIG. 1 depicts a plot of a non-linear system, in accordance with preferred embodiments of the present invention.

FIG. 1 depicts a plot of a non-linear system 1, in accordance with preferred embodiments of the present invention. Given a very simple (e.g., one-dimensional) non-linear system, such as the non-linear system in FIG. 1, the system can be balanced when the sensor measurement, f(m), is driven to zero. The objective of such a system is to find a value for a counterbalance $\Delta m$ such that the sensor measurement f(m) is driven to zero, i.e., f(m)=0. Utilizing a Taylor's series expansion in the vicinity of the anticipated operating range and neglecting second order and higher terms, one can generate a linear model of the form y=b+mx. The linear model can be written to reflect the example illustrated in FIG. 1, where several possible line estimates are shown; equation 1 expresses this relationship.

$$f(m_{next}) \approx f(m_{aftertest}) + \left(\frac{\partial f(m)}{\partial m}\right) \cdot (m_{next} - m_{aftertest}) \quad (1)$$

Those skilled in the art can appreciate that $f(m_{next})$ represents the desired sensor measurement. In addition, $f(m_{aftertest})$ can represent the sensor measurement after a test or a prior balance-control action. The variable m generally represents the out-of-balance in the system. For example, the variable $m_{aftertest}$ generally represents the out-of-balance after a test action ($\Delta m_{test}$), and the change in m, (i.e., $\Delta m = m_{next} - m_{aftertest}$), is the counterbalance required to achieve a desired sensor measurement, ($f(m_{next})$=0). The control action involves progressively moving in the direction of the estimated counterbalance and updating the system model and the required counterbalance estimate as control progresses. Those skilled in the art can appreciate that this control implementation of equation 1 represents the well-known Newton Raphson iteration method.

Since the objective is to find $f(m_{next})$=0, the general form of equation 1 reduces to:

$$m_{next} = m_{aftertest} - \left[\frac{\partial f(m)}{\partial m}\right]^{-1} \cdot f(m_{aftertest}) \quad (2)$$

where $m_{next}$ is the solution or system out-of-balance needed to make $f(m_{next})$=0 or to drive the sensor measurement to zero. Thus, the estimated mass change $\Delta m_{cb}$ generally required for counterbalance action is illustrated in equation 3.

$$\Delta m_{cb} = m_{next} - m_{aftertest} = -f(m_{aftertest}) \Big/ \left(\frac{\partial f}{\partial m}(m_{aftertest})\right) \quad (3)$$

The partial derivative, or slope of the sensor function, can be found by perturbing the system. This is generally illustrated in equation 4, which represents the change in sensor measurements due to a test action ($\Delta m_{test} = m_{aftertest} - m_{beforetest}$).

$$\frac{\partial f}{\partial m}(m_{aftertest}) = \frac{f(m_{aftertest}) - f(m_{beforetest})}{m_{aftertest} - m_{beforetest}} \quad (4)$$

Combining equations 3 and 4 results in the generalized form shown in equation 5. This equation is generally expressed in an expanded notion of multiple inputs and outputs.

$$[f(m_{aftertest})] = -\left[\frac{\partial f(m)}{\partial m}\right] \cdot [\Delta m_{cb}] \quad (5)$$

Regarding the linear models and associated slope calculation in FIG. 1, it can be appreciated that a change in the mass may result in a change in the system, and the system itself may be nonlinear; thus, the linear model used to determine the next counterbalance may have significant error. Therefore, when applying the Newton Raphson iteration to a process, certain requirements should be followed. First, the initial approximation should be sufficiently accurate to result in subsequent operation near the desired solution. Also the measurement f(m) should be smooth, nearly linear and single-valued in the vicinity of the anticipated operation. Additionally, because higher derivatives are neglected in this type of approximation, the higher derivatives should be small, so as to avoid convergence problems.

Figure 2:
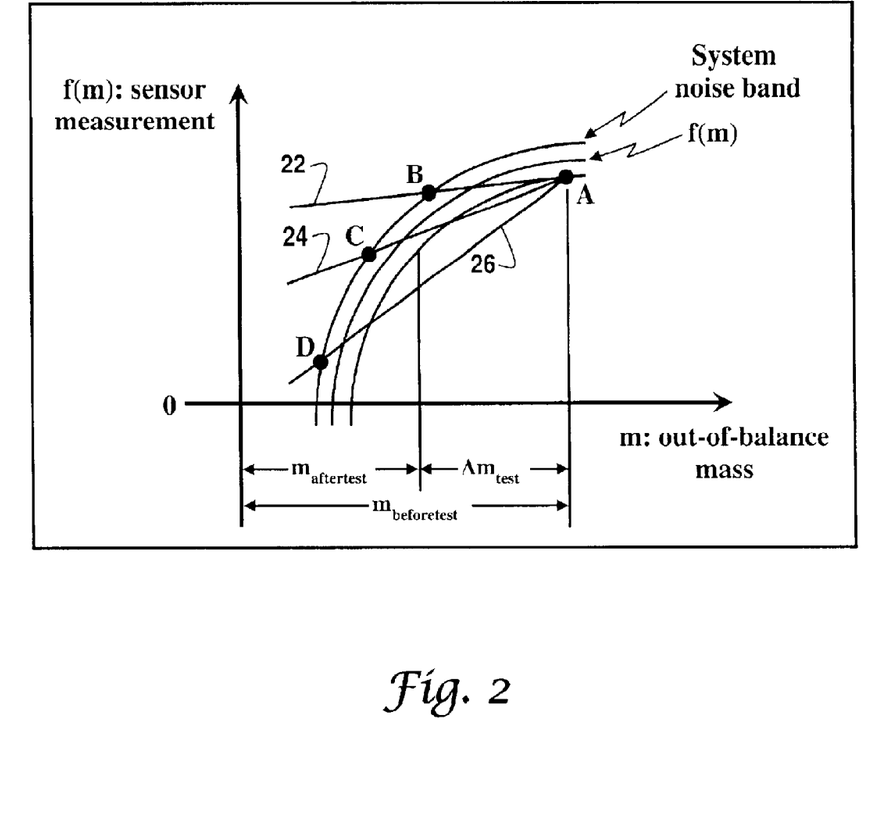
FIG. 2 illustrates a graphical representation of a nonlinear system and the effect of system noise with which the present invention must be concerned.

Lastly, in applications of the Newton Raphson iteration, only one solution, (counterbalance mass $\Delta m_{cb}$), should exist for the sensor measurement's being equal to zero. This means there is only one root. Even after following the above requirements, system noise may be a concern. In the hypothetical illustration of FIG. 2, a larger initial test action, which changes the system to point C, is preferable to the one that changes it to point B. This result can be illustrated by comparing the slopes of lines 22, 24 and 26, that result from the various test actions (perturbations) depicted in FIG. 2. The difference between the "before" and "after" test sensor measurements should be large enough to obtain a good approximation of the slope of the function and ensure that the resulting change in the measurement dominates the changes due to system noise.

Figure 3:
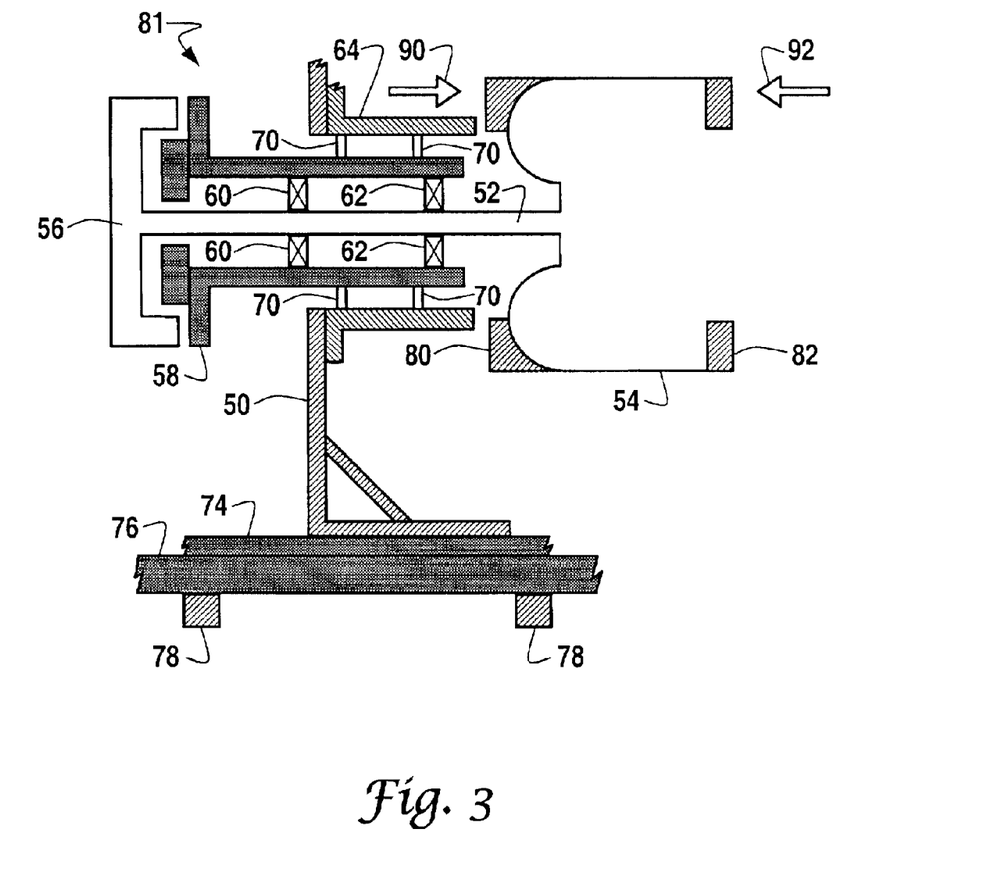
FIG. 3 depicts a schematic representation of a washing machine, which may be adapted for use in association with the present invention.

FIG. 3 depicts a schematic representation of a washing machine 81, which may be adapted for use in association with the present invention. Washing machine 81 is one type of a washing appliance that may be implemented in accordance with the method and system of the present invention.

Those skilled in the art can appreciate that the present invention may be implemented within a rotating device or rotating system, such as, for example, a washing machine. Those skilled in the art can further appreciate, however, that other types of rotating systems or rotating devices may be utilized in accordance with the present invention. Note that as utilized herein, the terms "rotating system," "rotating device," "rotating apparatus," "rotatable apparatus," "rotatable system," or "rotatable device" may be utilized interchangeably. The methods and systems of the present invention may be implemented to balance rotating systems, rotating devices or rotating members thereof.

In the example of FIG. 3, a rotatable drum 54 includes a plurality of schematically illustrated back cups 80 and front cups 82. Both the back and front cups 80 and 82 may be disposed at axial ends of the rotatable drum 54 and, although not shown in FIG. 3, both the back and front cups 80 and 82 can comprise a plurality of cups dispersed around the periphery of rotatable drum 54. A quantity of water can be injected into back cups 80 and/or front cups 82 from a stationary control valve supplied with water, such as those identified by reference numerals 90 and 92. This water injection to the cups is the basic mechanism of dynamic balancing in embodiment described in FIG. 3. Although the terms test mass or fluid injection are used to describe the preferred embodiment, those skilled in the art can appreciate that such a test or control action may be comprised of many different materials, and the invention is not limited to fluid-based injection methodologies for placing mass.

FIG. 3 thus schematically illustrates a washing machine 81 comprising a frame 50, a shaft 52 and a rotatable drum 54. Shaft 52 may be attached to rotatable drum 54. These two components can be attached to a rotor or pulley 56 of a motor drive. Frame 50 can provide support for a bearing housing 58 in which bearings 60 and 62 are generally supported. A housing mount 64 can support bearing housing 58. A plurality of sensors identified by the reference numeral 70 is illustrated between the housing mount and the bearing housing in FIG. 3. These sensors will be described in greater detail below. Beneath frame 50 are generally shown a carpet and pad 74, a plywood support member 76 and a plurality of joists 78. The representation shown in FIG. 3 illustrates a typical application of a horizontal washing machine in a residential housing environment. Those skilled in the art can appreciate that FIG. 3 is presented for illustrative purposes only and that a variety of washing machine configurations and other rotating devices not illustrated herein may be utilized to implement varying embodiments of the present invention. Washing machine 81 is thus described herein for illustrative purposes only and is not considered a limiting feature of the present invention.

Figure 5:
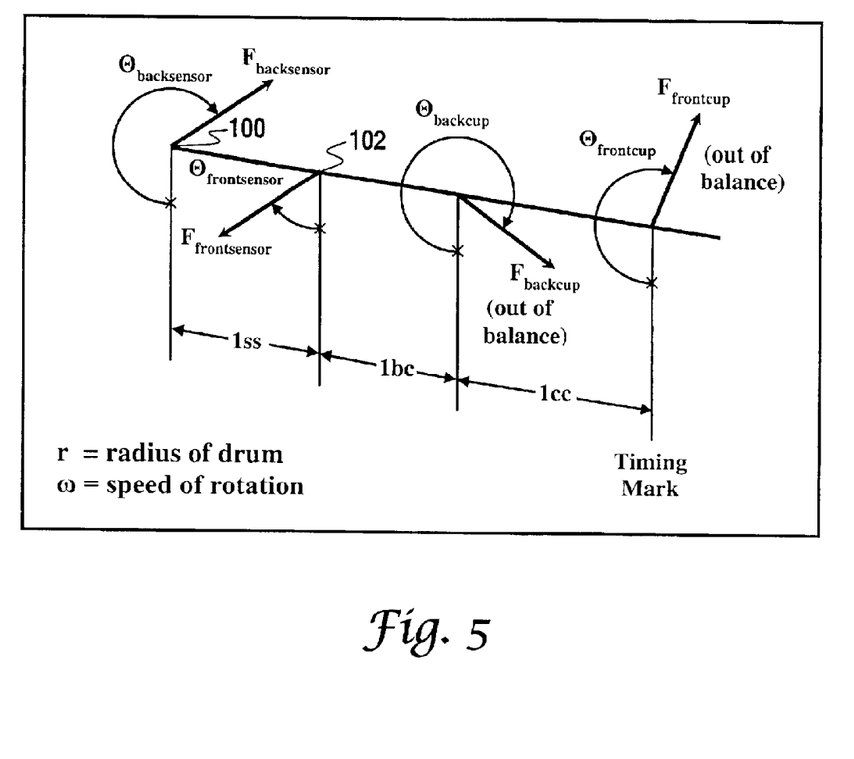
FIG. 5 depicts a three-dimensional schematic representation of the forces and critical lengths along an axis of rotation, which has been extended along a length of the shaft and through a length of the drum.

FIG. 5 illustrates a three-dimensional schematic representation of the forces and critical lengths along the axis of rotation, which has been extended along the length of the shaft and through the length of the drum. Force sensors may be mounted to measure the force transmitted between housing mount 64 and bearing housing 58, as illustrated in FIG. 3. The basic concept of dynamic balancing stipulates that vector forces at the front and back cups may represent an out-of-balance condition. Referring to FIG. 5, the system may be provided with a mechanism for sensing a first force $F_{backsensor}$ at a first location 100 of the axis of rotation and a second mechanism for measuring a second force $F_{frontsensor}$ at a second location 102 of the axis of rotation. It should be understood that both the first and second forces shown in FIG. 5 are likely to be determined from a plurality of force sensors arranged so the resultant force vectors along multiple axes of the system can be determined at each of the first and second locations, 100 and 102, of the axis of rotation.

If a washing machine or similar apparatus with a rotating member is rigidly attached to a stationary object, such as a concrete floor, then a mere force and moment analysis based on forces and moment arms shown in FIG. 5 would be appropriate. This analysis would thus yield sufficient information to allow counterbalance forces to be implemented in a manner that would achieve a balance of a rotating drum 54. However, in most practical residential housing applications the machine is not rigidly attached to an immovable object and, instead, may be associated with a plurality of flexible members. Therefore, it is not practical to expect a machine of this type to be installed and operate without motion being experienced by the various portions of the machine.

Figure 4:
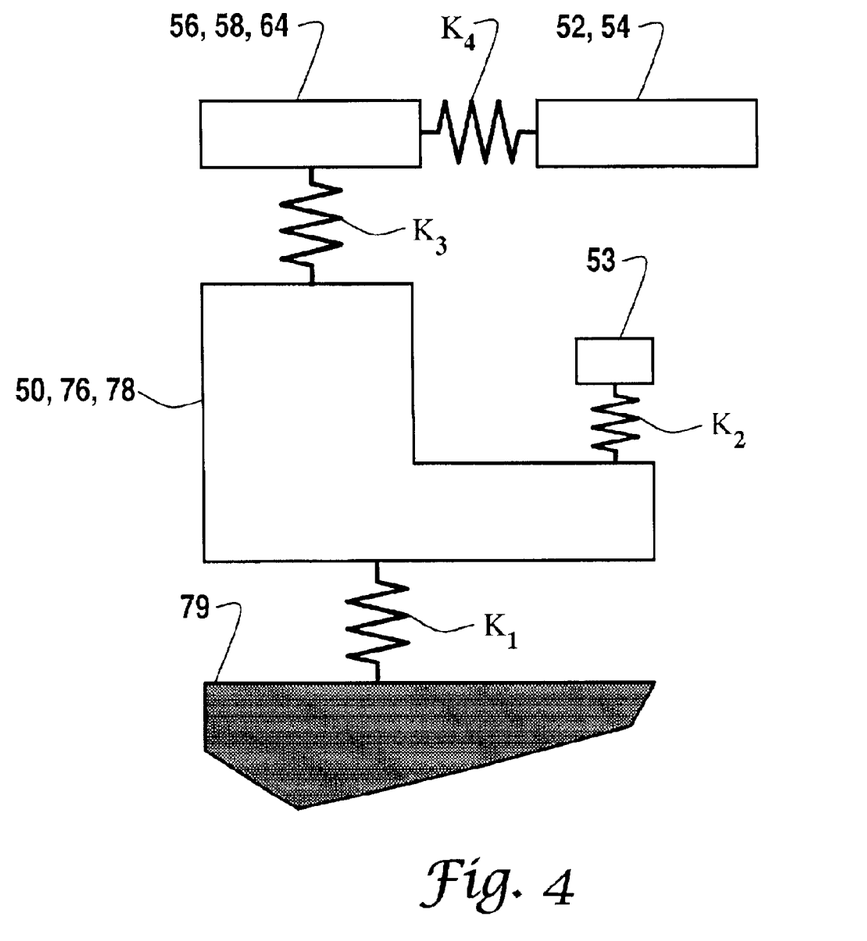
FIG. 4 illustrates a spring and mass configuration depicting the manner in which a nonrigid washing machine can behave if mounted on nonrigid structures.

FIG. 4, depicts a schematic representation of a type of arrangement usually encountered in washing machine applications. FIG. 4 thus illustrates a spring and mass system depicting the manner in which a nonrigid washing machine can behave if mounted on nonrigid structures. The behavior of frame 50 in relation to footing 79 can be described as a spring connecting the frame 50 and floor 76 to the footing 79 and having a spring constant K1. The relationship between a tub 53 (not shown in FIG. 3) surrounding the rotatable drum 54 and frame 50 can be described by a spring constant K2. A spring constant K3 represents the relationship between bearing housing 58 and housing mount 64 and frame 50 in FIG. 3. Lastly, FIG. 4 illustrates a spring constant K4 that represents the bending of shaft 52 along with rotatable members 54 and 56.

Although only represented by boxes in FIG. 4, the schematic illustration depicts a multitude of mass-spring subsystems that define the relationships among major components of the overall system. One purpose for including FIG. 4 is to demonstrate that the relationships among the components are not rigid and, as a result, can permit motion, resulting in accelerations, to occur in response to forces exerted on the various components. Therefore, measuring only the forces at sensors 70 shown in FIG. 3, would make accurate counterbalance determinations extremely difficult, if not impossible. Thus, it may be beneficial to measure motion relative to a footing or inertial space (e.g., acceleration) and account for it in the analysis of forces.

Figure 6:
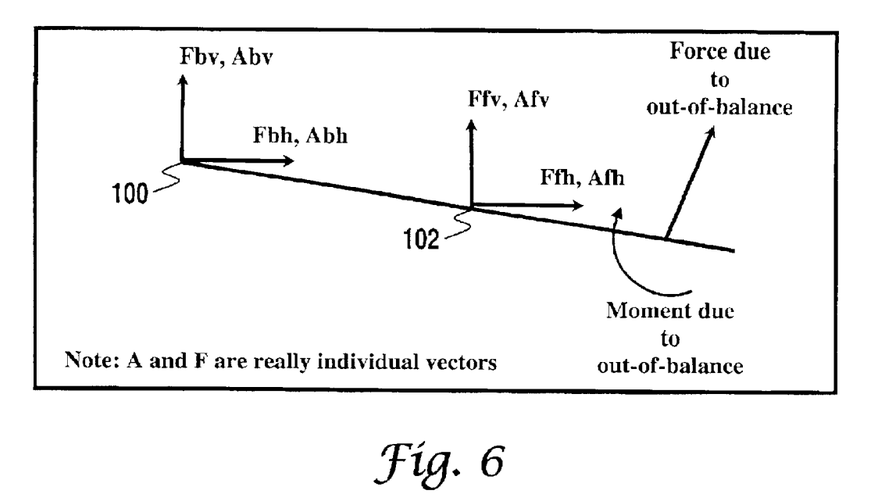
FIGS. 6 and 7 depict a graphical representation of a shaft with measured forces and accelerations.
Figure 7:
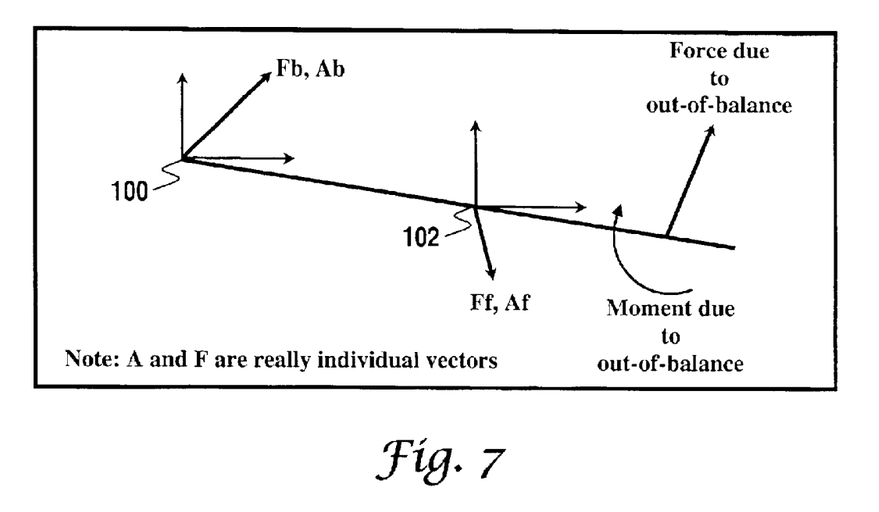

FIGS. 6 and 7 show the measurement of forces and accelerations in three-dimensional space at various locations along the shaft 52. Viewing FIGS. 6 and 7 together, it can be seen that the forces and accelerations can be measured at two coincident locations on the shaft 52. It can be appreciated, however, that this coincidence of the first force and the first acceleration or the second force and the second acceleration are not requirements of the present invention. At each of the first and second locations, 100 and 102, the effects of rotating out-of-balance forces are determined along the horizontal (h) and vertical (v) coordinates. Those skilled in the art can appreciate that the coordinates shown in FIGS. 6 and 7 illustrate the fact that the concepts taught in U.S. Pat. No. 5,561,993 and the present invention operate with information describing the forces and accelerations (motions) in terms of a magnitude along a fixed direction and an associated rotating drum angle.

TABLE I

| VARIABLE | DESCRIPTION |
|---|---|
| Inputs | |
| $\Delta m_{front\_cb}$ | test counterbalance mass placed in the front plane (vector) |
| $\Delta m_{back\_cb}$ | test counterbalance mass placed in the back plane (vector) |
| $\omega_{back}$ | speed of rotation in (rad/sec) at which the back plane test counterbalance |
| $\omega_{front}$ | speed of rotation in (rad/sec) at which the front plane test counterbalance |
| r | radius of counterbalance placement (inches) |
| $\omega$ | current speed of rotation |
| Outputs | |
| $f_{back}$ | back force sensor (lbf) (vector) |
| $f_{front}$ | front force sensor (lbf) (vector) |
| $a_{back}$ | back accelerometer sensor (in/sec$^2$) (vector) |
| $a_{front}$ | front accelerometer sensor (in/sec$^2$) (vector) |
| Actions | |
| $m_{backplane\_cb}$ | estimated backplane counterbalance to drive sensor readings to zero |
| $m_{frontplane\_cb}$ | estimated frontplane counterbalance to drive sensor readings to zero |

For the following discussion, Table I illustrates the inputs and outputs utilized in the multi-input/multi-output condition relating to the invention described in U.S. Pat. No. 5,561,993. In order to find the appropriate solutions for the counterbalance forces described above, measured forces and accelerations should be considered in the balancing of system forces and moments. As described above, the counterbalance masses, forces and accelerations represent magnitudes and angles. Therefore, all variables shown in Table I, except r and $\omega$ generally comprise both a magnitude and an angle in polar coordinates, which can be converted to complex coordinates. The relationship described in equation 5 above can be rewritten for the multi-input/multi-output case using the terms described in Table I. The result is four coupled simultaneous equations, incorporating the effects of perturbations in both front and back planes that could have occurred at rotational speeds slightly different from the current speed. These four relationships are shown below and identified as equation 6.

$$a_{back4} = -\left(\frac{a_{back1} - a_{back0}}{r \cdot \omega_{back}^2 \cdot \Delta m_{back\_cb}}\right) \cdot r \cdot \omega^2 \cdot m_{backplane\_cb} - \left(\frac{a_{back3} - a_{back2}}{r \cdot \omega_{front}^2 \cdot \Delta m_{front\_cb}}\right) \cdot r \cdot \omega^2 \cdot m_{frontplane\_cb}$$

$$a_{front4} = -\left(\frac{a_{front1} - a_{front0}}{r \cdot \omega_{back}^2 \cdot \Delta m_{back\_cb}}\right) \cdot r \cdot \omega^2 \cdot m_{backplane\_cb} - \left(\frac{a_{front3} - a_{front2}}{r \cdot \omega_{front}^2 \cdot \Delta m_{front\_cb}}\right) \cdot r \cdot \omega^2 \cdot m_{frontplane\_cb}$$

$$f_{back4} = -\left(\frac{f_{back1} - f_{back0}}{r \cdot \omega_{back}^2 \cdot \Delta m_{back\_cb}}\right) \cdot r \cdot \omega^2 \cdot m_{backplane\_cb} - \left(\frac{f_{back3} - f_{back2}}{r \cdot \omega_{front}^2 \cdot \Delta m_{front\_cb}}\right) \cdot r \cdot \omega^2 \cdot m_{frontplane\_cb}$$

$$f_{front4} = -\left(\frac{f_{front1} - f_{front0}}{r \cdot \omega_{back}^2 \cdot \Delta m_{back\_cb}}\right) \cdot r \cdot \omega^2 \cdot m_{backplane\_cb} - \left(\frac{f_{front3} - f_{front2}}{r \cdot \omega_{front}^2 \cdot \Delta m_{front\_cb}}\right) \cdot r \cdot \omega^2 \cdot m_{frontplane\_cb}$$

(6)

The four mathematical relationships illustrated in equation 6 above can be grouped together and treated as a matrix equation in the following discussion. The meanings of the subscripts in equation 6 above are identified in Table II.

TABLE II

| SUBSCRIPT | MEANING |
|---|---|
| 0 | measurement prior to back plane counterbalance test mass $\Delta m_{back\_cb}$ |
| 1 | measurement after back plane counterbalance test mass $\Delta m_{back\_cb}$ |
| 2 | measurement prior to front plane counterbalance test mass $\Delta m_{front\_cb}$ |
| 3 | measurement after front plane counterbalance test mass $\Delta m_{front\_cb}$ |
| 4 | current sensor measurement |

The relationships shown above in equation 6 can be applied to equation 5 in matrix form as:

$$\begin{bmatrix} a_{back4} \\ a_{front4} \\ f_{back4} \\ f_{front4} \end{bmatrix} = -\begin{bmatrix} \frac{a_{back1} - a_{back0}}{r \cdot \omega_{back}^2 \Delta m_{back\_cb}} & \frac{a_{back3} - a_{back2}}{r \cdot \omega_{front}^2 \Delta m_{front\_cb}} \\ \frac{a_{front1} - a_{front0}}{r \cdot \omega_{back}^2 \Delta m_{back\_cb}} & \frac{a_{front3} - a_{front2}}{r \cdot \omega_{front}^2 \Delta m_{front\_cb}} \\ \frac{f_{back1} - f_{back0}}{r \cdot \omega_{back}^2 \Delta m_{back\_cb}} & \frac{f_{back3} - f_{back2}}{r \cdot \omega_{front}^2 \Delta m_{front\_cb}} \\ \frac{f_{front1} - f_{front0}}{r \cdot \omega_{back}^2 \Delta m_{back\_cb}} & \frac{f_{front3} - f_{front2}}{r \cdot \omega_{front}^2 \Delta m_{front\_cb}} \end{bmatrix} \cdot \begin{bmatrix} m_{backplane\_cb} \\ m_{frontplane\_cb} \end{bmatrix} \cdot r \cdot \omega^2$$

(7)

where we describe this matrix equation as being in the form b=Ax and $$A = -\frac{\partial f(m)}{\partial m} = -\begin{bmatrix} \frac{a_{back1} - a_{back0}}{r \cdot \omega_{back}^2 \cdot \Delta m_{back\_cb}} & \frac{a_{back3} - a_{back2}}{r \cdot \omega_{front}^2 \cdot \Delta m_{front\_cb}} \\ \frac{a_{front1} - a_{front0}}{r \cdot \omega_{back}^2 \cdot \Delta m_{back\_cb}} & \frac{a_{front3} - a_{front2}}{r \cdot \omega_{front}^2 \cdot \Delta m_{front\_cb}} \\ \frac{f_{back1} - f_{back0}}{r \cdot \omega_{back}^2 \cdot \Delta m_{back\_cb}} & \frac{f_{back3} - f_{back2}}{r \cdot \omega_{front}^2 \cdot \Delta m_{front\_cb}} \\ \frac{f_{front1} - f_{front0}}{r \cdot \omega_{back}^2 \cdot \Delta m_{back\_cb}} & \frac{f_{front3} - f_{front2}}{r \cdot \omega_{front}^2 \cdot \Delta m_{front\_cb}} \end{bmatrix} \quad (8)$$

Equations 6, 7 and 8 depict the mathematical model generally described in U.S. Pat. No. 5,561,993. This mathematical model is formulated, such that the dynamics of the system are divided into two columns based on whether mass is placed in the front plane (i.e., column 2) or the back plane (i.e., column 1) of the spinner. The present invention disclosed herein may be used with this control model or like extensions, the more general solution of which allows for the placement of mass in both the front and the back plane simultaneously to formulate the control model and apply control actions and covers the case where more than two inputs to the system may be utilized.

The equation relationships shown in equation 7 can be rewritten in matrix format to solve for the counterbalance masses, $m_{backplane\_cb}$ and $m_{frontplane\_cb}$, required to bring the system into balance in the same manner as described in U.S. Pat. No. 5,561,993. For the case of four sensors and using the A matrix of equation 8, this can be expressed through equation 9 as:

$$r \cdot \omega \cdot \begin{bmatrix} m_{backplane\_cb} \\ m_{frontplane\_cb} \end{bmatrix} = -A^+ \cdot \begin{bmatrix} a_{back} \\ a_{front} \\ f_{back} \\ f_{front} \end{bmatrix} \quad (9)$$

In a situation such as that described by equation 9 above, four sensor values (i.e., two accelerations and two forces) are known from measurements and two counterbalance forces are unknown. This results in a situation where there are more equations than unknowns as each sensor provides an equation and there are only two unknown counterbalance forces for the front and back planes of the drum. This condition describes an over-determined system. An over-determined system may have more than one possible solution and a technique is generally required to solve for more equations than unknowns in an optimal manner.

A technique for solving equations of this type in a balancing scheme should find a solution that minimizes all of the sensor readings and also minimizes the amount of counterbalance media required to balance the rotating system. In other words, the force sensors and the accelerometers should all be driven as close to zero as possible by the selected counterbalances and the total amount of counterbalance media (i.e., fluid or mass) applied should be minimized.

Those skilled in the art can appreciate that a mathematical technique which may solve this problem involves computation of the pseudo-inverse of the A matrix ($A^+$) utilizing the singular value decomposition (SVD) technique. This solution method finds the optimal solution to the over-determined system shown in equation 9. The SVD is one of several techniques that can support the pseudo-inverse calculation for control. It can provide optimal control for both inputs and outputs of the modeled system. Other variations of the components that make up the SVD may be used alone but would not provide both input and output optimization. This procedure is fully described in U.S. Pat. No. 5,561,993 and is well known to those skilled in the art. It is also described in significant detail in various reference linear algebra textbooks.

After generating the solution to equation 9, it may be necessary to formulate a practical approach to applying the counterbalance mass to the rotating member and then evaluating the member to verify that the control action had the desired balancing affect. An approach to applying counterbalance and verifying the control action effect is fully described in U.S. Pat. No. 5,561,993, which is incorporated herein by reference. Those skilled in the art can appreciate that the approaches to applying counterbalance and verifying the control action effect, which were disclosed in U.S. Pat. No. 5,561,993, do not limit the scope of the present invention. The features, techniques, methods and systems disclosed in U.S. Pat. No. 5,561,993 are described herein for illustrative and background purposes only.

To accomplish balance control, balance control actions may place mass at the periphery of axial control planes on the centrifuge. Sensor measurements may be used to assess the immediate balance conditions through the use of measurement thresholds, established to direct the course of balance control. Measurements of the forces and motions at various locations within the rotatable apparatus are made before and after each control action and may be used to update the control model described by equations 7 through 9. That updated model along with further sensor measurements may be utilized to determine a prediction of the next required counterbalance control action. This process continues until balance condition is achieved (i.e., all sensor values below balance threshold) at full operating speed.

Relevant to the placement of balancing mass at the periphery of axial control planes on the centrifuge, a variety of control action actuation techniques have been developed for transferring balancing mass to a rotating apparatus from its stationary surroundings in order to dynamically balance a rotating system, such as, for example, a washing machine or dishwasher. These techniques require accuracy in the amount and placement of the counterbalancing mass because a limited amount of mass can be placed at a specific location only once per revolution. The actuator action is a step action with a flow and transport timing characteristic. On/off actuated valve methods and systems (e.g., solenoid actuated valves) have been developed to place fluid mass on a rotating apparatus or rotating system so as to achieve balance. These methods and associated systems suffer from a dependence on head pressures from one control action to the next and inconsistent flow-rate and transport-timing profiles across a single control action, which can lead to uncertainty in the amount and placement of the counterbalancing mass. Additionally, these methods and systems poorly address the need to adjust flow rate, such that an increased flow is present at lower rotating speeds where balancing generally occurs, and less flow is present at higher rotating speeds where minor balancing corrections may be required.

The present invention discloses methods and systems for transferring balancing mass to a rotating apparatus from its stationary surroundings, reduces the dependence on head pressure, improves flow-rate and transport-timing consistency within a single control action, and supports differing flow rates to accommodate different control needs across operational speeds. A flow of balancing mass can be continuously provided to the rotating system at a controlled flow rate as opposed to mass being generated from an injector valve. A pump can be used to supply the continuous controlled flow of balancing mass; one pump may serve multiple flow streams. The controlled flow rate of the balancing mass may be adjusted through a variable speed pump and can also be adjusted utilizing a nozzle device. The controlled flow rate can be adjusted automatically or otherwise to account for varying rotation speeds of the rotating system at continuous or discrete levels. The varying flow rates are utilized for different control needs such as large mass transfer at lower speeds for initial balance and small mass transfers at higher speeds for fine balance adjustments.

The flow of balancing mass can be thereafter discharged at a shutter device that may be integrated with or connected to the rotating system, such that the balancing mass passes through a window of the shutter device when allowed, thereby contributing to the balancing of the rotating system. The shutter device may be a slotted-disk or other shutter type structure, e.g., a solenoid-actuated shutter. The solenoid-actuated shutter may simply be configured as an open-close action with a fixed window size. Such a shutter may thus be opened and closed to place mass across a particular angular span of the rotating apparatus or rotating system that requires balancing. The rotating slotted-disk may have a window that can be configured as an adjustable or fixed window. An adjustable window would be sized for the desired angular span and the slotted-disk would rotate in lock step with the rotating apparatus. A fixed window may accommodate different angular spans via relative speed. Those skilled in the art can thus appreciate that this arrangement permits the placement of fluid to be very responsive because it is no longer necessary to deal with valve hydrodynamics or mechanics.

The balancing mass is generally automatically recirculated if the window of the shutter device is closed, and placed balance mass is collected after the spin operation is complete. This allows the balance mass system to be a closed system where the same substance is reused for subsequent balance operations, thereby allowing balance mass materials different from those being extracted by the centrifuge process, i.e., tap water for the washing machine application. Thus, differing density balance mass materials may be used and susceptibility to particulate build up or corrosion is reduced. Additionally, the method and system of the present invention are on the order of complexity, or less, than that of a solenoid actuated valve.

Figure 8:
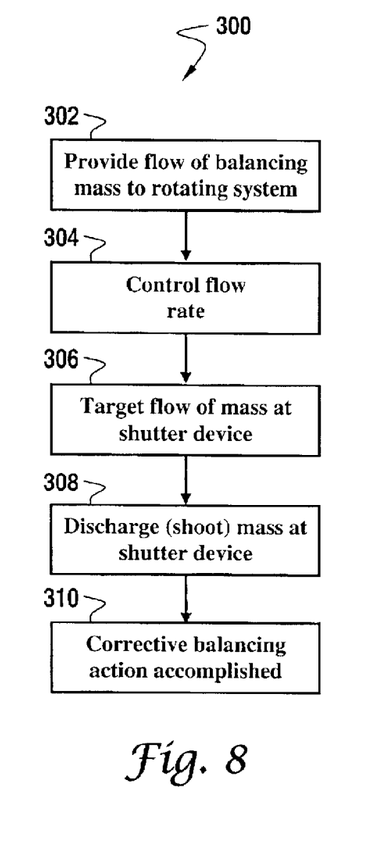
FIG. 8 depicts a high-level flow chart of operations illustrating general operational steps that may be implemented in accordance with preferred embodiments of the present invention.

FIG. 8 illustrates a high-level flow chart 300 of operations illustrating general operational steps that may be implemented in accordance with preferred embodiments of the present invention. As illustrated at block 302, a flow of balancing mass can be continuously provided to the rotating system. The balancing mass is provided to the rotating system at a controlled flow rate, as indicated at block 304. The balancing fluid may be targeted at a shutter device integrated with or connected to the rotating system in order to discharge the flow of the balancing mass through a window of the shutter device, as illustrated at block 306. The flow of balancing mass can be thereafter discharged at the shutter device, such that the balancing mass passes through a window of the shutter device if the window is open, thereby contributing to the balancing of the rotating system, and recirculated through the rotating system if the window of the shutter device is closed, as depicted at block 308. Corrective balancing actions may then be accomplished, as indicated at block 310.

Figure 9:
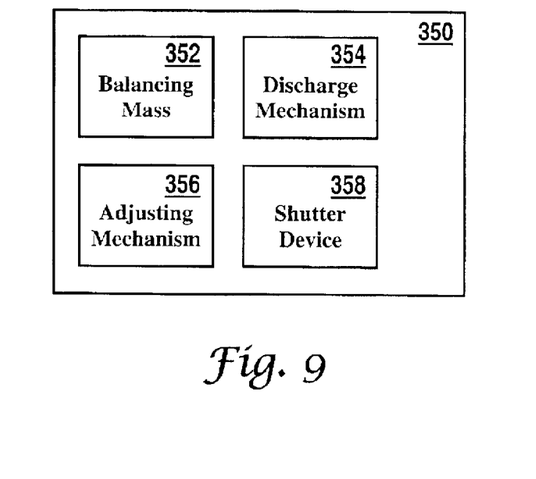
FIG. 9 is a high-level system diagram illustrating a system that can be implemented in accordance with preferred embodiments of the present invention.

FIG. 9 depicts a high-level system diagram 350 illustrating a system that can be implemented in accordance with preferred embodiments of the present invention. FIG. 9 thus illustrates a system for transferring balancing mass to a rotating system or rotating device, in order to dynamically balance the rotating system. Thus, the system illustrated in FIG. 9, including variations to such a system, may be utilized in accordance with a self-balancing rotatable apparatus, such as the self-balancing rotatable apparatus illustrated in FIGS. 1 to 7 herein.

System 350 generally includes a flow of balancing mass 352, which may be continuously provided at a controlled flow rate to the rotating device or system; a pump can be utilized to continuously provide the balancing mass at a controlled flow rate. The balancing mass 352 can be targeted or directed at shutter device 358 in order to discharge the flow of the balancing fluid through the window of the shutter device. System 350 may also include a discharge mechanism 354 for discharging the flow of the balancing fluid at a shutter device 358 integrated with the rotating system, such that the balancing fluid passes through a window of the shutter device, to the rotating device, if the window is open. The balancing fluid 352 can be recirculated through the rotating system if the window of the shutter device 358 is closed. The features described above thus contribute collectively to the balancing of the rotating system.

System 350 can additionally include an adjusting mechanism 356 for adjusting the controlled flow rate to account for different control needs at varying rotational speeds of the rotating system or device. Such adjustments may be performed manually or, preferably, automatically and at continuous or discrete levels.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. For example, those skilled in the art can appreciate the methods described herein, including mathematical formulations, can be implemented as a program product in the form of varying software modules, routines, and subroutines. Those skilled in the art can further appreciate that the present invention disclosed herein can be utilized in association with any centrifuge application for extracting fluids. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

What is claimed is:

1. A method for dynamically balancing a rotating system, such that a balancing mass is transferable to at least one predetermined location within said rotating system, said method comprising the steps of:

continuously providing a flow of said balancing mass at a controlled flow rate, directed at a shutter device integrated with said rotating system;

automatically recirculating said balancing mass if a window of said shutter device is closed; and discharging said flow of said balancing mass at said shutter device, such that said balancing mass passes through said window of said shutter device if said window is open to thereby collect on said rotating device and contribute to the balancing of said rotating system.

2. The method of claim 1 wherein the step of continuously providing a flow of said balancing mass at a controlled flow rate, directed at a shutter device integrated with said rotating system, further comprises the step of:

continuously pumping said flow of said balancing mass at a controlled flow rate to said rotating system utilizing a pump integrated with said rotating system.

3. The method of claim 1 further comprising the step of:
adjusting said controlled flow rate to account for varying control requirements across a plurality of rotational speeds associated with said rotating system.

4. The method of claim 1 wherein said window comprises an adjustable window utilized to pass said balancing mass to said at least one predetermined location within said rotating device.

5. The method of claim 1 wherein said window comprises a fixed window utilized to pass said balancing mass to said at least one predetermined location within said rotating device.

6. The method of claim 1 wherein said shutter device comprises a solenoid actuated shutter.

7. The method of claim 1 wherein said shutter device comprises a slotted-disk device.

8. The method of claim 3 wherein the step of adjusting said controlled flow rate to account for varying control requirements across a plurality of rotational speeds associated with said rotating system, further comprises the step of:
adjusting said controlled flow rate of said balancing mass utilizing a nozzle device integrated with said rotating system.

9. The method of claim 3 wherein the step of adjusting said controlled flow rate to account for varying control requirements across a plurality of rotational speeds associated with said rotating system, further comprises the step of:
adjusting said controlled flow rate of said balancing mass utilizing a variable speed pumping device integrated with said rotating system.

10. The method of claim 3 wherein the step of adjusting said controlled flow rate to account for varying control requirements across a plurality of rotational speeds associated with said rotating system, further comprises the steps of:
automatically adjusting said controlled flow rate of said balancing mass at lower rotational speeds associated with said rotating system, if an increased rate of flow of said balancing mass is required to balance said rotating system; and
automatically adjusting said controlled flow rate of said balancing mass at increased rotational speeds associated with said rotating system, if minor balancing corrections are required for said rotating system.

11. A system for dynamically balancing a rotating device, wherein said rotating device, such that a balancing mass is transferable to at least one predetermined location within said rotating device, said system comprising:
a flow of said balancing mass that is continuously provided at a controlled flow rate and which is directed at a shutter device integrated with said rotating device;
wherein said balancing mass is automatically recirculated if a window of said shutter device is closed; and
wherein said flow of said balancing mass is discharged at said shutter device, such that said balancing mass passes through said window of said shutter device if said window is open to thereby collect on said rotating device and contribute to the balancing of said rotating device.

12. The system of claim 11 wherein said flow of said balancing mass is continuously pumped at a controlled flow rate to said rotating device utilizing a pump integrated with said rotating device.

13. The system of claim 11 wherein said controlled flow rate is adjustable to account for varying control requirements across a plurality of rotational speeds associated with said rotating device.

14. The system of claim 11 wherein said window comprises an adjustable window utilized to pass said balancing mass to said at least one predetermined location within said rotating device.

15. The system of claim 11 wherein said window comprises a fixed window utilized to pass said balancing mass to said at least one predetermined location within said rotating device.

16. The system of claim 11 wherein said shutter device comprises a solenoid actuated shutter.

17. The system of claim 11 wherein said shutter device comprises a slotted-disk device.

18. The system of claim 13 wherein said controlled flow rate of said balancing mass is adjustable utilizing a nozzle device integrated with said rotating device.

19. The system of claim 13 wherein said controlled flow rate of said balancing mass is adjustable utilizing a variable speed pumping device integrated with said rotating device.

20. The system of claim 13 wherein:
said controlled flow rate of said balancing mass is automatically adjustable at lower rotational speeds associated with said rotating device if an increased rate of flow of said balancing mass is required to balance said rotating device; and
said controlled flow rate of said balancing mass is automatically adjustable at increased rotational speeds associated with said rotating device, if minor balancing corrections are required for said rotating device.

* * * * *